US00RE33870E

United States Patent [19]

Fittro et al.

[11] E Patent Number: Re. 33,870

[45] Reissued Date of Patent: Apr. 7, 1992

[54] ROCKER ARM BEARING ASSEMBLY

[75] Inventors: David Fittro, Farmington; Arnold E. Fredericksen, Winsted, both of Conn.

[73] Assignee: The Torrington Company, Torrington, Conn.

[21] Appl. No.: 592,002

[22] Filed: Aug. 30, 1990

Related U.S. Patent Documents

Reissue of:

[64] Patent No.: 4,858,575
Issued: Aug. 22, 1989
Appl. No.: 162,448
Filed: Mar. 1, 1988

[51] Int. Cl.[5] ..... F01L 1/00

[52] U.S. Cl. ..... 123/90.410; 384/622; 74/519; 74/559

[58] Field of Search ..... 384/622, 621, 615, 565, 384/584, 440, 154, 2; 74/559, 519; 123/90.39, 90.41, 90.42

[56] References Cited

U.S. PATENT DOCUMENTS

| | | | |
|---|---|---|---|
| 2,430,359 | 11/1947 | Messinger | 384/622 |
| 3,621,823 | 11/1971 | Lombardi | 74/519 |
| 4,120,542 | 10/1978 | Bhateja et al. | 384/622 |
| 4,497,307 | 2/1985 | Paar et al. | 123/90.41 |
| 4,628,874 | 12/1986 | Barlow | 74/519 |
| 4,718,379 | 1/1988 | Clark | 123/90.41 |
| 4,783,183 | 11/1988 | Gardella | 384/622 |
| 4,796,483 | 1/1989 | Patel et al. | 74/559 |
| 4,878,463 | 11/1989 | Fredericksen et al. | 74/559 |

*Primary Examiner*—E. Rollins Cross
*Assistant Examiner*—M. Macy
*Attorney, Agent, or Firm*—John C. Bigler

[57] ABSTRACT

The rocker arm bearing assembly has a rocker arm which oscillates on a bearing support member and an associated pair of bearings. The bearings are self-contained units with an outer race, an inner race, and multiple rollers positioned between the two races. Full-complement radial bearings are preferably utilized. The bearings are supported on the bearing support member to form an integral unit which can be dropped into the rocker arm. This allows for speedy assembly of the rocker arm with the bearing and support member unit.

6 Claims, 2 Drawing Sheets

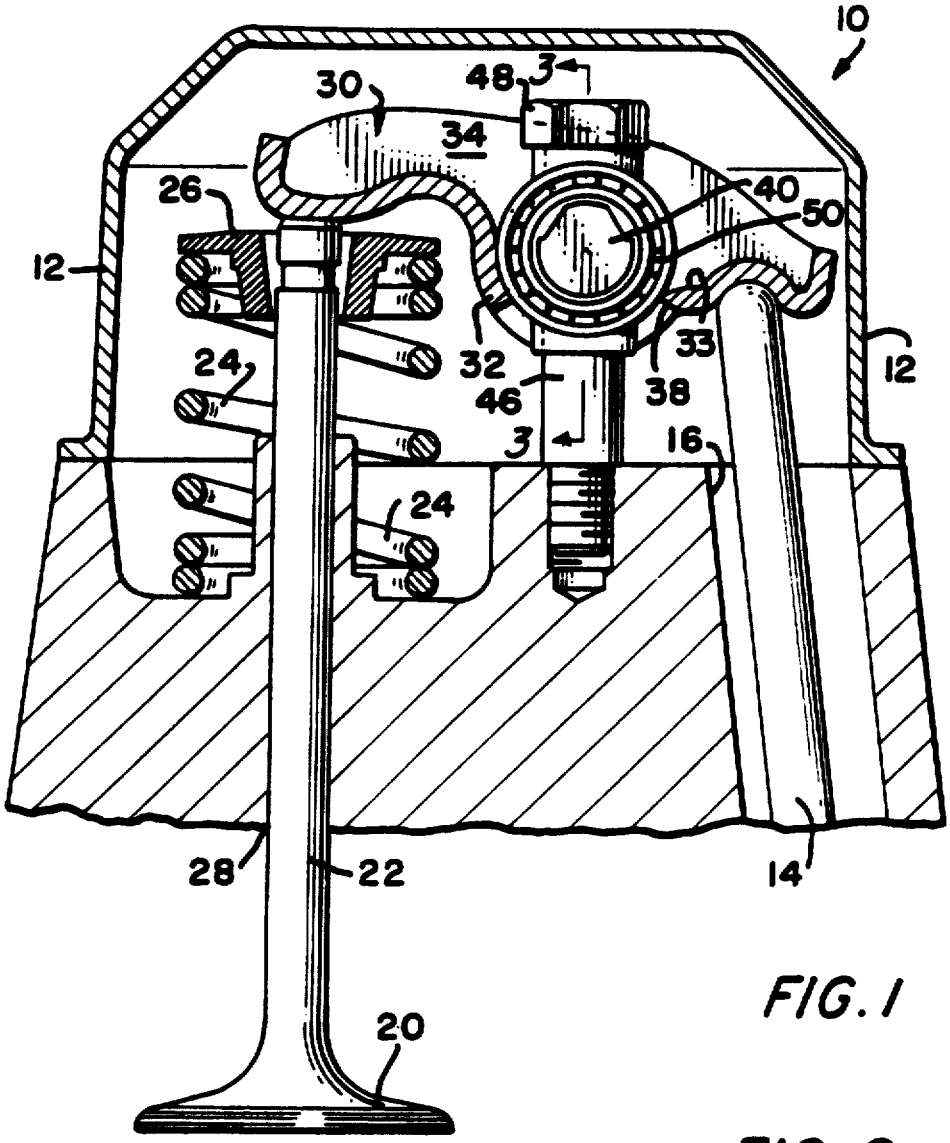
FIG. 1
FIG. 2
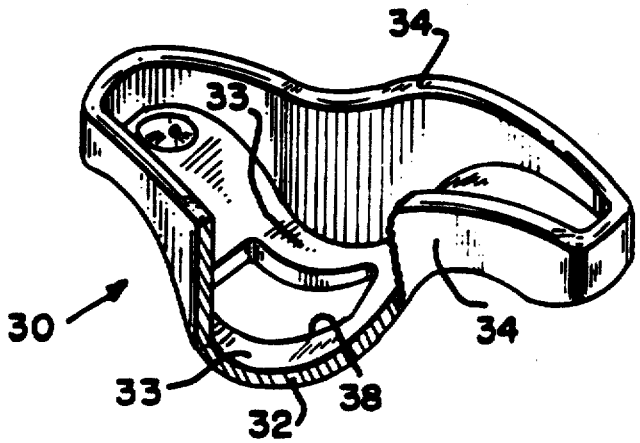

ROCKER ARM BEARING ASSEMBLY

Matter enclosed in heavy brackets [ ] appears in the original patent but forms no part of this reissue specification; matter printed in italics indicates the additions made by reissue.

This invention relates to oscillating anti-friction bearings. More particularly, this invention is an oscillating rocker arm bearing assembly utilized with a support stud.

The rocker arm bearing assembly is designed as a one-piece unit which can be assembled by simply dropping a pivot member, with attached bearings, into a rocker arm which is configured to receive and retain the pivot member and bearings. This invention is particularly well-suited for use with internal combustion engine valve train rocker arms.

Conventional valve train rocker arms use various bearing surface means to accommodate the loads generated by the oscillating motion of the rocker arms. Some rocker arms have a pair of arcuate pockets extending in the direction of oscillation in order to carry stress loads on rollers situated in these pockets. Examples of this type of rocker arm include U.S. Pat. No. 4,577,911 for an "Oscillating Bearing", issued on Mar. 25, 1986, in the names of Arnold E. Fredericksen and Robert D. Richtmeyer, and U.S. Pat. No. 4,313,732 for an "Oscillating Bearing", issued in the name of William W. Murphy on Feb. 9, 1982.

Other rocker arms utilize more complex bearings having an outer race, an inner race, and rollers to support an oscillating fulcrum member. See U.S. Pat. No. 4,440,121, for a "Locknut Device For Engine Rocker Arm Adjustment", issued on Apr. 3, 1984, in the name of Terence J. Clancy et al. This type of rocker arm assembly extends the life and load capacity of the fulcrum member bearings by using much more complex bearings than those of the type described in U.S. Pat. No. 4,314,732 to Murphy and U.S. Pat. No. 4,577,911 to Fredericksen et al. However, these prior art bearings also require relatively laborious assembly of the rocker arm bearing assemblies in order to utilize these more complex bearings.

The rocker arm bearing assembly of this invention allows relatively easy assembly using a bearing support member which has two self-contained bearings attached so as to form a unitary piece which can be dropped into place inside the rocker arm.

Briefly described, the rocker arm bearing assembly comprises a rocker arm which is configured to receive two horizontally-extending arms protruding from a bearing support member. These arms are coaxial and support two coaxial bearings, one on each arm, on which the rocker arm oscillates. This invention provides a configuration which allows the support member and its associated bearings, connected as an integral unit, to be easily dropped into the rocker arm for speedy assembly. The rocker arm has an elongate aperture in its lower surface. The bearing support member partially extends through this aperture and is mounted on a support stud which is attached to an engine.

This invention, as well as its many advantages, may be further understood by reference to the following detailed description and drawings in which:

FIG. 1 is a side view, partially in section, showing a portion of an internal combustion engine utilizing the rocker arm bearing assembly of the present invention;

Figure 4:
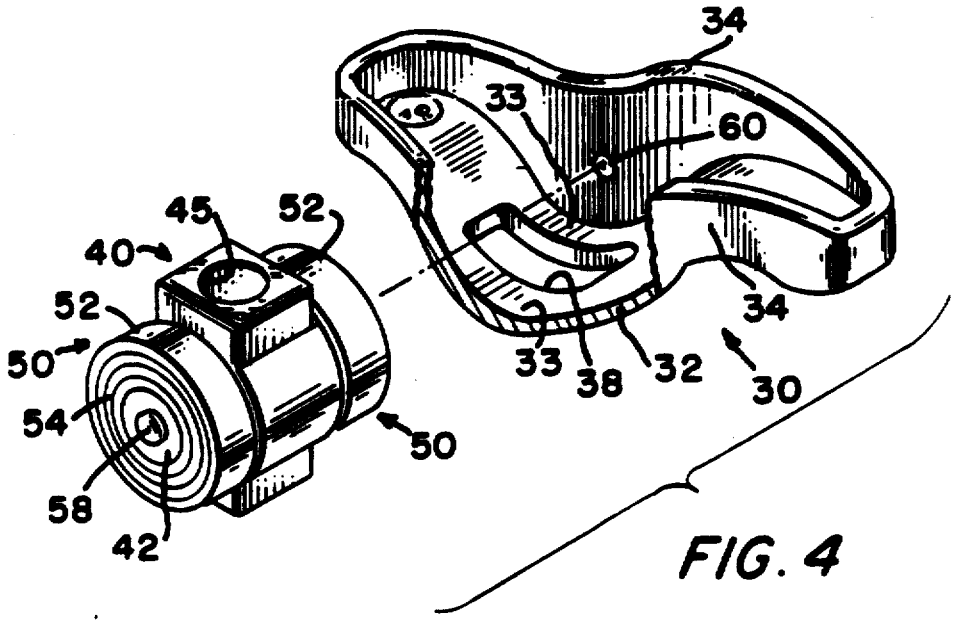

FIG. 2 is a perspective view of the rocker arm only, illustrating the upper surface of the lower portion of the rocker arm, as well as an elongate aperture through the lower portion; and FIG. 4 is an exploded view of a modified embodiment of the rocker arm and bearing support member, illustrating protuberances extending from the outer surface of the support member toward the side walls of the rocker arm, and indents in the rocker arm side walls extending inwardly toward the protuberances.

Referring to the drawings and more particularly to FIG. 1, a portion of an engine 10 is illustrated to show the relative positions of a cylinder head 12, a push rod 14 extending through a bore 16 within the cylinder head 12, an engine poppet valve 20 and its valve stem 22 which are biased to the closed position by a spring 24 held in place by a retainer 26, and a rocker arm 30. Stem 22 also extends through a bore 28 in the cylinder head 12. This preferred embodiment of the present invention also includes a bearing support member 40 and bearings 50, which are described in more detail below.

As seen in FIG. 2, the rocker arm 30 has a lower portion 32 from which two side walls 34 extend in an upward direction. Lower portion 32 has an upper surface 33. An elongate aperture 38 extends through lower portion 32 of rocker arm 30 to receive a T-shaped bearing support member 40 with two horizontally extending arms 42, each arm having a circumferential outer surface 43 and an end surface 47. Member 40 has a bore 45 formed about its central vertical axis to allow a loose clearance fit with a vertically-extending support stud 46. A fastener, such as a retainer nut 48 shown in FIGS. 1 and 2, is attached to the upper threaded end of stud 46, thereby holding bearing support member 40 and its associated bearings 50 in place. Each bearing 50 is preferably of the drawn cup type and comprises an outer race 52, an inner race 54, and a full complement of rollers 56 located between the inner and outer races. In the preferred embodiment, rollers 56 are loaded into the outer race 52, and the inner race 54 is force fitted inside and concentric with the rollers. Inner and outer races 54 and 52, respectively, have shoulders on opposite sides to prevent the rollers 56 from falling out of the bearing 50. The shoulder of the inner race 54 is preferably on the outer side of bearing 50 closest to the side wall 34; therefore, the outer race shoulder would be on the inner side closest to stud 46. Outer race 52 may also have a second shoulder on the same side as the inner race 54, if desired.

Figure 3:
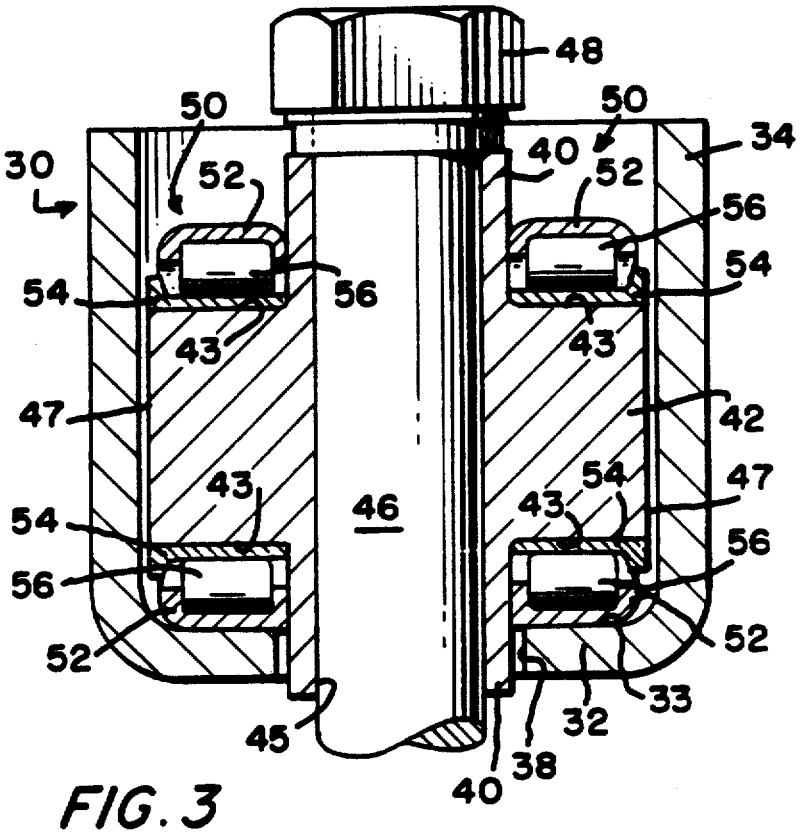
FIG. 3 is an enlarged partial sectional view of the rocker arm bearing assembly, taken along line 3—3 of FIG. 1, which illustrates the relative positions of a rocker arm and a bearing support member.

The bearings 50 may be held onto arms 42 by various means. The preferred method is to force fit each bearing 50, so that the inner race 54 is immovably positioned on arm 42. Alternate methods include a slip fit between each bearing 50 and an arm 42, and staking the outer edges of arms 42 adjacent to the inner race 54 to prevent bearing 50 from moving away from bore 45. This retention allows support member 40 and bearings 50 to be handled as a single unit. During assembly, the support member 40/bearings 50 unit can be easily dropped into the center of rocker arm 30 so that the lower end of member 40 descends through aperture 38 (see FIG. 3)

until the lower surface of bearings 50 contacts the upper surface 33 of rocker arm position 32.

As push rod 14 and valve stem 22 move up and down in a coordinated manner, rocker arm 30 is caused to oscillate on the lower surface of bearings 50. Looking at FIG. 1, arm 30 oscillates in a plane parallel to the page of the drawing. Looking at FIG. 3, arm 30 oscillates in a plane perpendicular to the drawing page. Preferably, if possible the rollers 56 are allowed to precess around the bearing and arm 42 of support member 40 as rocker arm 30 oscillates on bearings 50. Precession is highly desirable, since it would result in more even wear of the multiple rollers 56. This would tend to increase the life of the bearing 50 and lessen the likelihood of premature failure due to constant load stress being applied to a small number of the same rollers 56.

The use of drawn cup radial bearings 50, or similar bearings, provides the advantage of reducing the noise generated by the rocker arm 30. Most bearing surfaces of the prior art tend to wear relatively quickly and thus result in sticking surfaces which produce a clattering noise.

Although alternative bearing designs could be used with the present invention to achieve an integral bearing support member/bearing unit, the preferred embodiment provides the advantage that the outer surface 43 of pivot member arm 42 does not require grinding or hardening, since the outer surface does not function as the bearing inner raceway for bearings 50.

Possible modifications of the preferred embodiment of the present invention include the use of bearings which comprise an outer race, rollers, and an inner raceway formed on the outer surface 43 of bearing support member arms 42. As discussed above, this alternate bearing design would require the additional labor and cost of grinding and hardening the outer surface of arms 42 in order to provide an adequate raceway for the modified bearing.

Another possible modification is illustrated in FIG. 4. As shown, each arm 42 of bearing support member 40 has a protuberance 58 extending outwardly from its end surface 47. Each protuberance 58 is centered about the common axis of arms 42. FIG. 4 shows a cylindrical protuberance 58, but other configurations such as a rectangular pad, could obviously be used with equally effective results. In addition, each side wall 34 of rocker arm 30 has an indent 60 extending inwardly toward the corresponding protuberance 58. The convex surface of indent 60 rides on protuberance 58 to further minimize friction as rocker arm 30 oscillates on bearings 50. Alternative embodiments of this invention could include the use of protuberances 58 without utilizing indents 60; conversely, indents 60 could be used without protuberances 58.

We claim:

1. A rocker arm bearing assembly comprising:

an immovable support stud;

a bearing support member [immovably affixed to] *around* said stud, said member being configured so as to support and retain two coaxial bearings;

a rocker arm having a generally cup-shaped configuration, said arm having a lower portion with an arcuate shape, said arm also having at least two side walls upwardly-extending from said lower portion, and said lower portion having an elongate aperture formed therethrough so as to accommodate said stud and said support member; and means for supporting said support member within said rocker arm so as to provide for oscillating movement of said rocker arm on said two bearings, wherein said means comprises two horizontally-extending arms integrally attached to said support member, each of said arms having an end surface; and a convex protuberance projecting outwardly from each of said end surfaces of said support member arms.

2. A rocker arm bearing assembly comprising:

an immovable support stud;

a bearing support member [immovably affixed to] *around* said stud, said member being configured so as to support and retain two coaxial bearings;

a rocker arm having a generally cup-shaped configuration, said arm having a lower portion with an arcuate shape, said arm also having at least two side walls upwardly-extending from said lower portion, and said lower portion having an elongate aperture formed therethrough so as to accommodate said stud and said support member; and means for supporting said bearing support member within said rocker arm so as to provide for oscillating movement of said rocker arm on said two bearings, wherein said means comprises two horizontally-extending arms integrally attached to said support member, each of said arms having an end surface; and an indent formed in each of said two rocker arm side walls so as to form convex surfaces inside each of said side walls, said two convex surfaces being positioned so as to mate with said support member arm end surfaces and thereby allow said rocker arm to oscillate on said two convex surfaces and said two bearings.

3. A rocker arm bearing assembly according to claim 1, wherein said means for supporting said bearing support member within said rocker arm further comprises an indent formed in each of said two rocker arm side walls so as to form convex surfaces inside each of said side walls, said two convex areas being positioned so as to mate with said protuberances and thereby allow said rocker arm to oscillate on said two protuberances and said two bearings.

*4. A rocker arm and bearing assembly comprising:*

*a rocker arm having a bottom surface, the bottom surface having an aperture;*

*a bearing assembly in the rocker arm, the bearing assembly having a bearing support member with two noncylindrical arms extending in opposite directions, and a bearing mounted on each arm, each bearing having an outer race, an inner race, and rolling members therebetween, the bottom portion of each bearing outer race being in contact with the rocker arm bottom surface, said bearing support member having a bore aligned with the rocker arm bottom surface aperture; and*

*a stud extending through the bearing support member bore and the rocker arm bottom surface aperture so that the rocker arm and each bearing outer race are free to oscillate in the same direction.*

*5. A rocker arm and bearing assembly comprising:*

*a rocker arm having a bottom surface, the bottom surface having an aperture;*

*a bearing assembly in the rocker arm, the bearing assembly having a bearing support member with two arms extending in opposite directions and a bearing mounted on each arm, each bearing having an outer race, an inner race, and rolling members therebe-*

*tween, the bottom portion of each bearing outer race being in contact with the rocker arm bottom surface, said bearing support member having a bore aligned with the rocker arm bottom surface aperture, the inner race and the outer race are each provided with means to prevent the rolling members from falling out of the bearing in a direction away from the stud means or in a direction toward the stud means; and*

*a stud means extending through the bearing support member bore and the rocker arm bottom surface*

*aperture so that the rocker arm and each bearing outer race are free to oscillate in the same direction.*

*6. A rocker arm and bearing assembly in accordance with claim 5 wherein:*

*the inner race of each bearing has a shoulder, the rolling members being located between said shoulder and the stud means, and the outer race has a shoulder located between the rolling members and the stud means.*

* * * * *